United States Patent
Hamada et al.

(10) Patent No.: US 7,535,699 B2
(45) Date of Patent: May 19, 2009

(54) ELECTRONIC APPARATUS WITH KEYBOARD

(75) Inventors: Tomohiro Hamada, Tokyo (JP); Yasuyuki Horii, Tokyo (JP); Masanori Sato, Tokyo (JP); Hiroyuki Minaguchi, Saitama (JP); Hidemi Itakura, Tokyo (JP); Fuminori Yamazaki, Tokyo (JP); Satoshi Yokote, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/050,039

(22) Filed: Mar. 17, 2008

(65) Prior Publication Data

US 2008/0165477 A1  Jul. 10, 2008

Related U.S. Application Data

(62) Division of application No. 11/072,601, filed on Mar. 4, 2005, now Pat. No. 7,385,808.

(30) Foreign Application Priority Data

Sep. 30, 2004 (JP) ............... P2004-286464

(51) Int. Cl.
*G06F 1/16* (2006.01)
(52) U.S. Cl. ............ 361/680; 200/302.1; 400/496
(58) Field of Classification Search ......... 361/679–683; 200/302.1; 400/496
See application file for complete search history.

(56) References Cited

U.S. PATENT DOCUMENTS

| | | | |
|---|---|---|---|
| 4,396,830 A | 8/1983 | Isozaki et al. | |
| 4,864,523 A | 9/1989 | Sasaki | |
| 4,948,281 A | * | 8/1990 | Werner ............ 400/472 |
| 5,335,141 A | 8/1994 | Hosoi | |
| 5,421,659 A | 6/1995 | Liang | |
| 5,483,418 A | 1/1996 | Hosoi | |
| 5,689,400 A | 11/1997 | Ohgami et al. | |
| 5,808,860 A | 9/1998 | Ohgami et al. | |
| 5,808,861 A | 9/1998 | Nakajima | |
| 6,156,983 A | * | 12/2000 | Chen et al. ............ 200/302.1 |
| 6,198,626 B1 | 3/2001 | Nakajima et al. | |

(Continued)

FOREIGN PATENT DOCUMENTS

CN  2327005 Y  6/1999

(Continued)

OTHER PUBLICATIONS

English translation of Dec. 15, 2006 Office Action in Chinese Application No. 200510066806.1.

(Continued)

*Primary Examiner*—Jayprakash N Gandhi
*Assistant Examiner*—Anthony Q Edwards
(74) *Attorney, Agent, or Firm*—Blakely, Sokoloff, Taylor & Zafman LLP (57) ABSTRACT

According to one embodiment, an electronic apparatus with a keyboard coupled to a cable, comprises a housing including a wall on which the keyboard is mounted, the wall including an opening, a circuit board which is accommodated inside the housing, and to which the cable is coupled through the opening, a sheet which is arranged between the wall and the keyboard, and which covers the opening, the sheet including a cable insertion portion through which the cable is inserted.

16 Claims, 6 Drawing Sheets

U.S. PATENT DOCUMENTS

| | | |
|---|---|---|
| 6,262,883 B1 | 7/2001 | Kim |
| 6,317,314 B1 | 11/2001 | Kung et al. |
| 6,398,436 B1 | 6/2002 | Chao et al. |
| 6,443,644 B1 | 9/2002 | Takeda et al. |
| 6,542,355 B1* | 4/2003 | Huang .................. 361/680 |
| 6,610,944 B2 | 8/2003 | Lee et al. |
| 6,641,317 B1 | 11/2003 | Tsau |
| 6,661,650 B2 | 12/2003 | Nakajima et al. |
| 6,716,518 B2 | 4/2004 | Chao |
| 6,803,865 B2* | 10/2004 | DeLuga .................. 341/22 |
| 6,860,660 B2 | 3/2005 | Hochgesang et al. |
| 7,030,330 B2* | 4/2006 | Suda .................. 200/302.2 |
| 2003/0057076 A1* | 3/2003 | Lee et al. ............. 200/302.1 |
| 2003/0129010 A1 | 7/2003 | Tsai |
| 2003/0215277 A1 | 11/2003 | Godsted |
| 2004/0201974 A1 | 10/2004 | Yu |
| 2005/0040972 A1 | 2/2005 | Hamada |
| 2005/0041378 A1 | 2/2005 | Hamada |
| 2006/0165465 A1* | 7/2006 | Wu .......................... 400/491 |

FOREIGN PATENT DOCUMENTS

| | | |
|---|---|---|
| JP | 05-053711 | 3/1993 |
| JP | 05-210725 | 8/1993 |
| JP | 06-187090 | 7/1994 |
| JP | 2002-182788 | 6/2002 |
| JP | 2002-196838 | 7/2002 |
| JP | 2002-352659 | 12/2002 |
| JP | 2004-286464 | 9/2004 |

OTHER PUBLICATIONS

United States Office Action dated Jul. 23, 2007 for U.S. Appl. No. 11/072,601, filed Mar. 4, 2005 entitled Electronic Apparatus With Keyboard.

* cited by examiner

ELECTRONIC APPARATUS WITH KEYBOARD

CROSS-REFERENCE TO RELATED APPLICATIONS

This application is based upon and claims the benefit of priority from Japanese Patent Application No. 2004-286464, filed Sep. 30, 2004, the entire contents of which are incorporated herein by reference.

BACKGROUND

1. Field

One embodiment of the invention relates to an electronic apparatus with a keyboard such as a portable computer and the like.

2. Description of the Related Art

The main body of an electronic apparatus such as a portable computer has a housing that accommodates a circuit board and the like, and a keyboard is arranged on the upper part of the housing.

In general, accidental spillage of liquids, for example water, to the main body causes problem, because there is the circuit board inside the housing. Therefore, to avoid such spilled liquid from reaching the circuit board, a waterproof measure is needed.

U.S. Pat. No. 6,610,944 (hereinafter "reference") discloses an electronic apparatus with such waterproof measure. The reference discloses the draining means that has a first drainage hole formed in the base of the keyboard, and a guide channel that has a second drainage hole formed in the lower surface of the base of the keyboard. Also, a third drainage hole that has a cover is formed below the second drainage hole.

In the drainage means of the reference, because a plurality of dedicated drainage holes are formed in the main body or the keyboard, the configuration of the keyboard and the main body at those portions is complex and the metallic mold for molding is also complex. Furthermore, special consideration is given to the position of the drainage holes, and thus such architecture may cause the problem that the design freedom is limited.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

DETAILED DESCRIPTION

Various embodiments according to the present invention will be described hereinafter with reference to the accompanying drawings. In general, according to one embodiment of the invention, an electronic apparatus with a keyboard coupled to a cable, comprises a housing including a wall on which the keyboard is mounted, the wall including an opening, a circuit board which is accommodated inside the housing, and to which the cable is coupled through the opening, a sheet which is arranged between the wall and the keyboard, and which covers the opening, the sheet including a cable insertion portion through which the cable is inserted.

Figure 1:
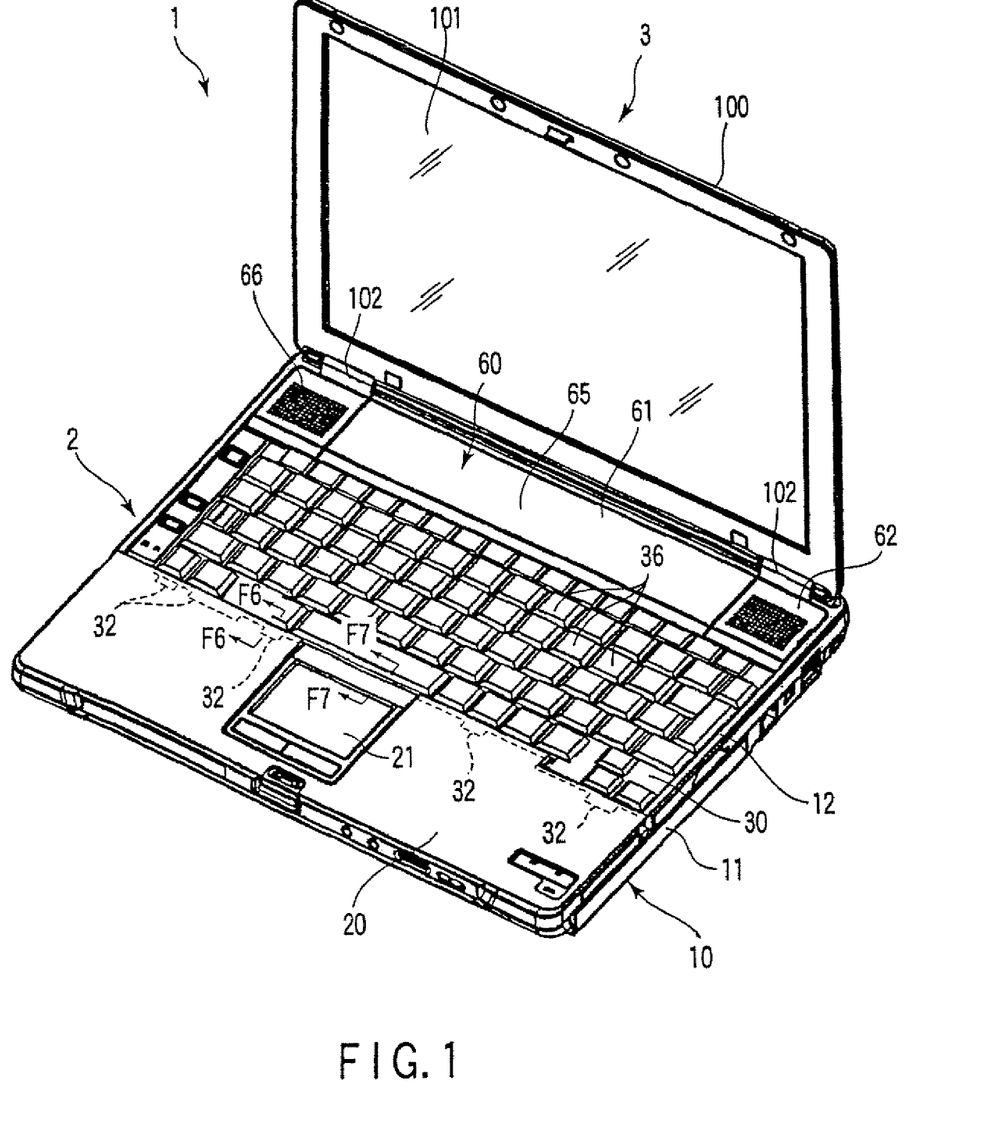
FIG. 1 is a perspective view of an exemplary portable computer according to an embodiment of the present invention.

FIG. 1 shows a portable computer 1 as an example of the electronic apparatus. The portable computer 1 comprises a main body unit 2 and a display unit 3.

Figure 2:
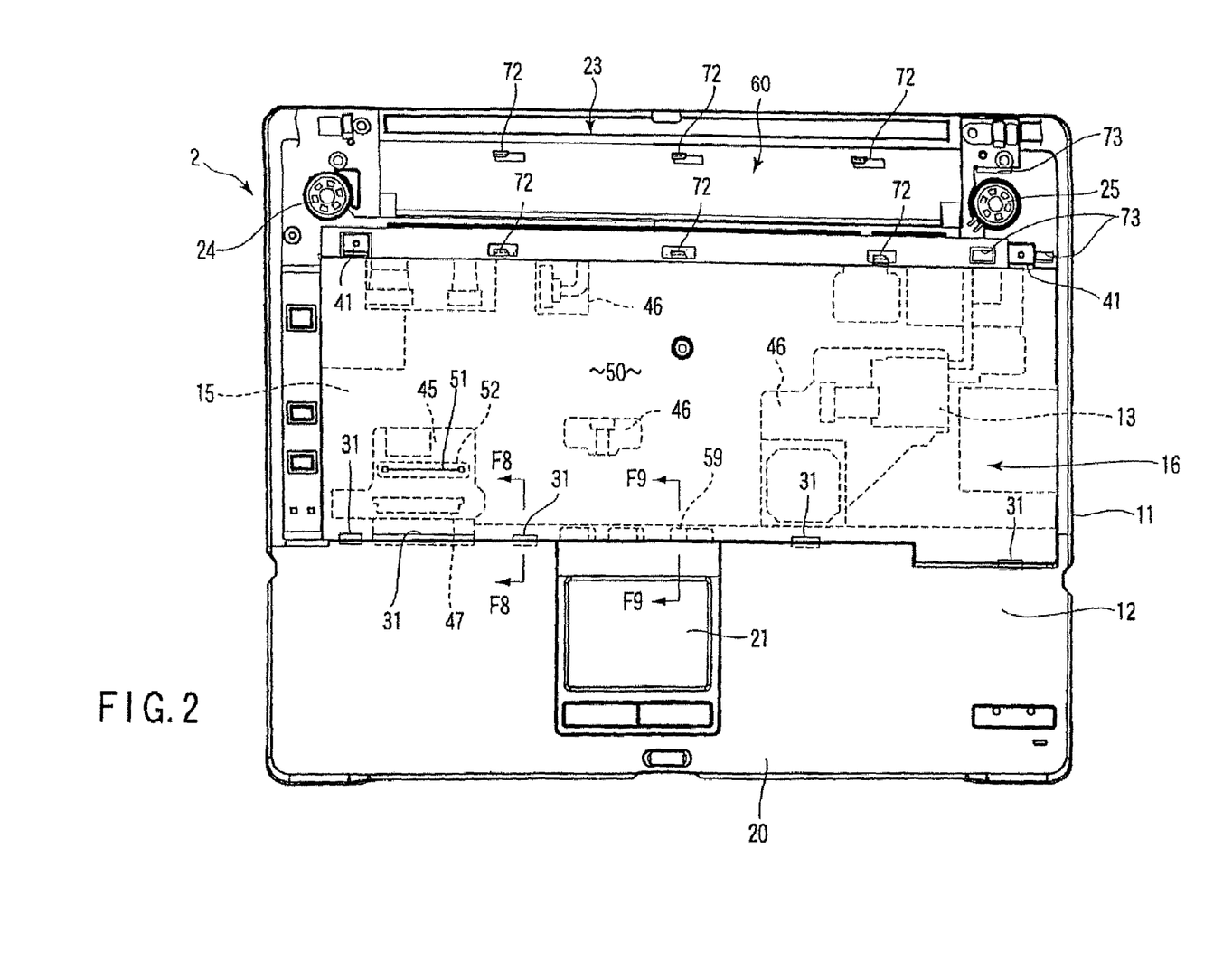
FIG. 2 is a plan view of an exemplary main body of the portable computer in a state where a keyboard and a cover have been removed according to the embodiment.
Figure 3:
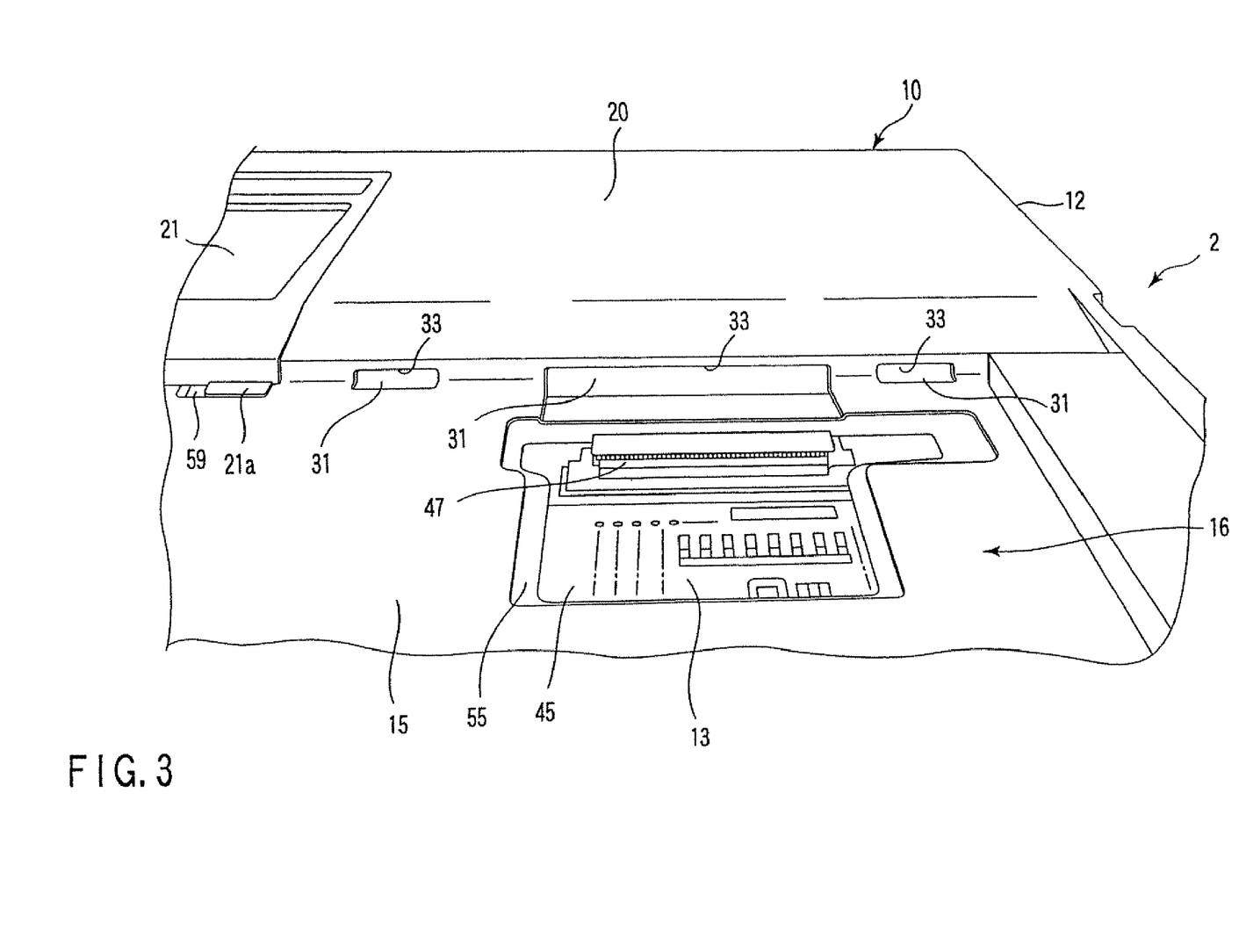
FIG. 3 is a exemplary perspective view showing a portion of a housing according to the embodiment.

The main body unit 2 comprises a flat box-like housing 10. As shown in FIGS. 1, 2, and 3, the housing 10 comprises a lower housing 11 that essentially forms the lower half of the housing 10 and an upper housing 12, which essentially forms the upper half of the housing 10. A circuit board 13 is built inside the housing 10. The circuit board 13 is a system board, and includes electronic parts and the like thereon. The electronic parts on the circuit board 13 include a CPU to control the portable computer 1.

The upper housing 12 that forms a portion of the housing 10 has a bottom wall 15 (hereinafter "wall"). The wall 15 forms a part of a keyboard mounting portion 16. The wall 15 is formed so as to be forwardly inclined, that is, the front portion on the upper surface of the wall 15 is lower than the rear portion on the upper surface thereof. In other words, the wall 15 is tilted at an angle such that the front is lower than the back when the case 10 is mounted on a level surface. The upper housing 12 that includes the wall 15 may be formed of a light metal such as a magnesium alloy and the like, and is electrically conductive.

The palm rest 20 which is formed by a portion of the upper housing 12 and an input device 21 such as a touch pad and the like are provided at the front of the main body unit 2. A battery storage portion 23 that stores a battery (not shown) as the power source is formed at the rear of the main body unit 2. Electronic parts such as speakers 24 and 25 are mounted at the rear of the main body unit 2.

Figure 4:
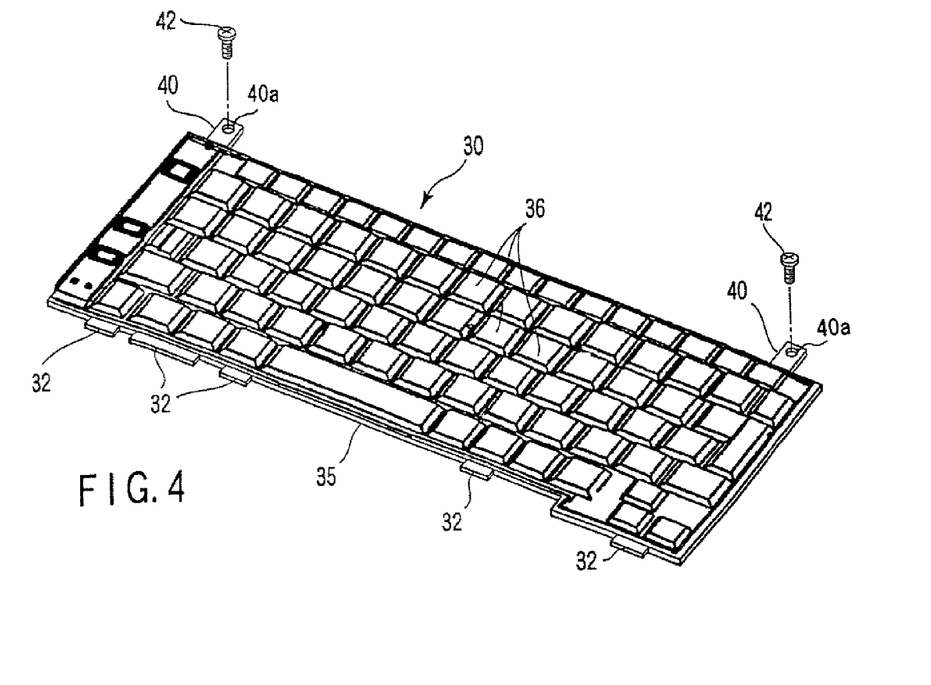
FIG. 4 is a perspective view of the exemplary keyboard according to the embodiment.

The keyboard 30 that is shown in FIG. 4 is mounted on the keyboard mounting portion 16 formed on the upper surface of the main body unit 2. The keyboard 30 is the drip-proof or waterproof type and has a cable 48 connected thereto as partially shown in FIG. 5. The cable 48 will be described hereinafter.

As shown in FIGS. 2, 3, 6 and 8, engaging slots 31 for securing the keyboard 30 are formed at a plurality of locations in the width direction of the front of the upper housing 12. Convex portions 32 (shown in FIGS. 1, 4, and 6) which function as engagement portions with the engaging slots 31 are formed at the front end of the keyboard 30 at positions corresponding to the engaging slots 31. The convex portions 32 are formed at a plurality of locations at prescribed intervals in the width direction of the keyboard 30.

Figure 6:
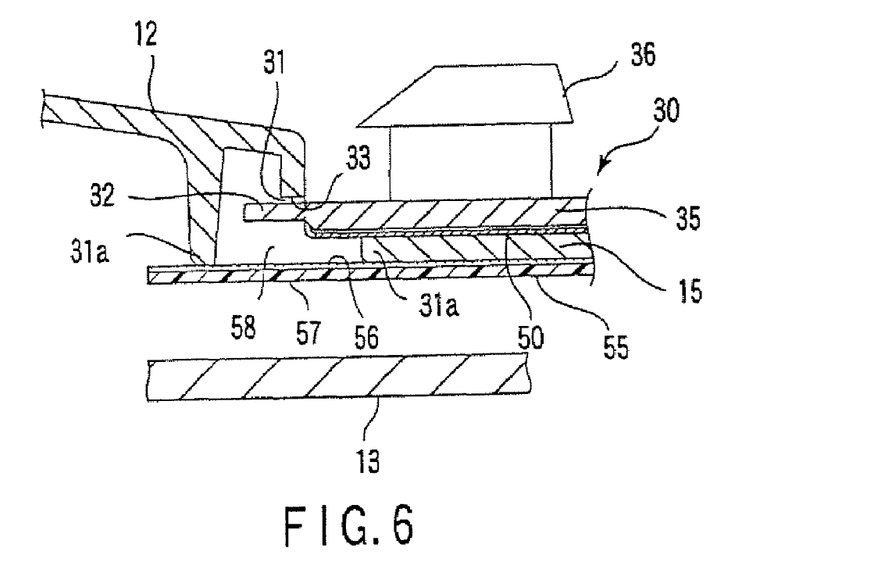
FIG. 6 is an exemplary sectional view cut off along a line F6-F6 in FIG. 1 according to the embodiment.

As shown in FIG. 6, by inserting the convex portions 32 into the engaging slots 31 which correspond to the respective convex portions 32, the front end of the keyboard 30 is supported by the housing 10. Receiving portions 33 (shown in FIGS. 3 and 6), which may be engaged with the upper surface of the convex portion 32, are formed at the upper portion of the engaging slots 31. The receiving portions 33 protrude downward towards a portion of the upper housing 12. The keyboard 30 comprises the base 35 and the key tops 36. The convex portions 32 are formed at the front end of the base 35.

As shown in FIG. 4, a pair of right and left mounting portions 40 is formed at the rear end of keyboard 30. Keyboard support portions 41 are formed at positions corresponding to the mounting portions 40 on the upper case 12. A threaded hole 40a in each mounting portion 40 is formed, and the mounting portions 40 are fixed to the keyboard support portion 41 by fixing members 42 such as screw.

As described above, because the wall 15 of the upper housing 12 has a slight downward incline, the front portion of the keyboard 30 that is mounted on the wall 15 is slightly lower than the rear portion thereof. Due to this slight downward incline, the operational characteristics of the keyboard 30 are improved. Furthermore, because of this incline, if liquid such as water spills on the keyboard 30, the liquid flows in the direction of the front end of the wall 15.

As shown in FIGS. 2 and 3, openings 45 and 46 which open at the upper surface side are formed at a plurality of locations in the wall 15. The openings 45 and 46 expose a portion of the circuit board 13. Of the openings 45 and 46, as shown in FIG. 2, the opening 45 which is positioned at the left front portion of the wall 15 exposes a circuit part, for example, connector 47, which forms the electrical connection between the keyboard 30 and the circuit board 13. The cable 48 (shown in FIG. 5) such as a flat cable or the like is connected to the connector 47. In this way, the cable 48 forms the electrical connection between the circuit board 13 and the keyboard 30.

Figure 5:
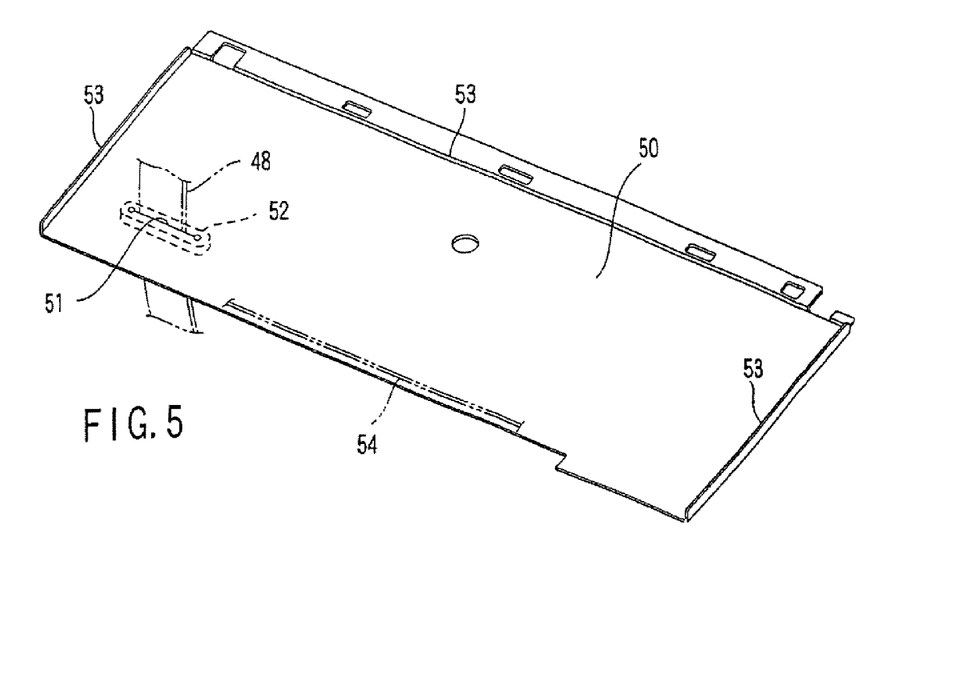
FIG. 5 is a perspective view of an exemplary sheet of the portable computer according to the embodiment.

A "waterproof" sheet 50, as shown in FIG. 5, which functions as a liquid impermeable sheet and is formed from a material that is substantially or completely impervious to liquid (i.e., substantially or completely prevents liquid from passing therethrough), is disposed between the wall 15 and the keyboard 30. The sheet 50 is wider in area than the keyboard 30 when viewed from the upper surface side such that it may cover the openings 45 and 46 of the wall 15 from above. A cable insertion portion 51 through which the cable 48 passes is formed in the sheet 50.

The cable insertion portion 51 has a slit through which the cable 48 (see in FIG. 5) that is a flat cable or the like may be passed. The absorption member 52 that is made from a liquid absorptive material is provided around the cable insertion portion 51.

The sheet 50 has an erect wall 53 positioned at one or more edges along a width of the sheet 50. The erect wall 53 is formed by folding an end portion of the sheet 50 in the upper direction, and prevents liquid on the surface of the sheet 50 from flowing from the edge portion of the sheet 50 to the outside. Also, because the front of the wall 15 slopes downward and erect walls 53 are formed at both sides of the sheet 50, liquid that spills onto the sheet 50 flows toward the front end of the sheet 50.

It is to be noted that an absorption member 54 made of a liquid absorptive material, as shown in FIG. 5, may be provided along a lengthwise edge of the sheet 50 so as to absorb liquid flowing downward on the sheet 50.

Figure 8:
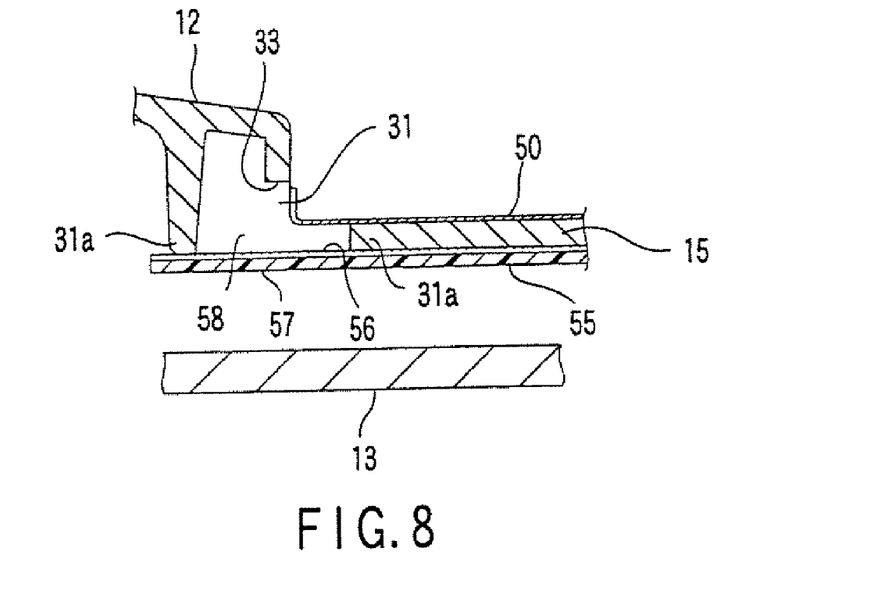
FIG. 8 is an exemplary sectional view cut off along a line F8-F8 in FIG. 2 according to the embodiment.

As shown in FIGS. 3, 6, and 8, a sheet-like insulator 55 formed from an electrically insulating material is arranged between the wall 15 of the upper housing 12 and the circuit board 13. The area of the insulator 55 is sufficient to cover the entire upper surface of the circuit board 13 with the exception of the openings 45 and 46. The insulator 55 prevents electrical shorting caused by contact between the conductive bottom wall 15 and the circuit board 13. The upper surface of the insulator 55 is fixed to the lower surface of the wall 15 by the both-sided adhesive tape 56.

The front edge of the insulator 55 extends in the forward direction, and forms the waterproof portion 57. The waterproof portion 57 functions as a cover for the lower portion of the engaging slots 31 of the wall 15 inside the housing 10. The upper surface of the waterproof portion 57 is bonded to the edge portion of the lower wall 31a of the engaging slots 31 by the adhesive tape 56. Because of this structure, any liquid that enters the inner side of the engaging hole 31 does not leak in the downward direction.

The lower wall 31a of the engaging hole 31 has an opening in order for the portion of the metal mold used when molding the receiving portions 33 to be removable in the vertical direction. For this reason, the lower end opening portion of the lower wall 31a which has an opening is covered by the waterproof portion 57 which is a portion of the insulator 55.

The both-sided adhesive tape 56 which is provided at the waterproof portion 57 functions as a seal member for sealing the space between the lower wall 31a of the engaging hole 31 and the waterproof portion 57. Because the waterproof portion 57 covers the lower wall 31a of the engaging hole 31, a liquid storage portion 58 with a cross-sectional configuration like a bag with an open top is formed.

It is to be noted that front end of the sheet 50 may have a configuration such that the liquid on the sheet 50 is not prevented from flowing into the engaging hole 31. For example, a part of the sheet 50, which is the position corresponding to the engaging hole 31, may have opening portions or notches.

Figure 7:
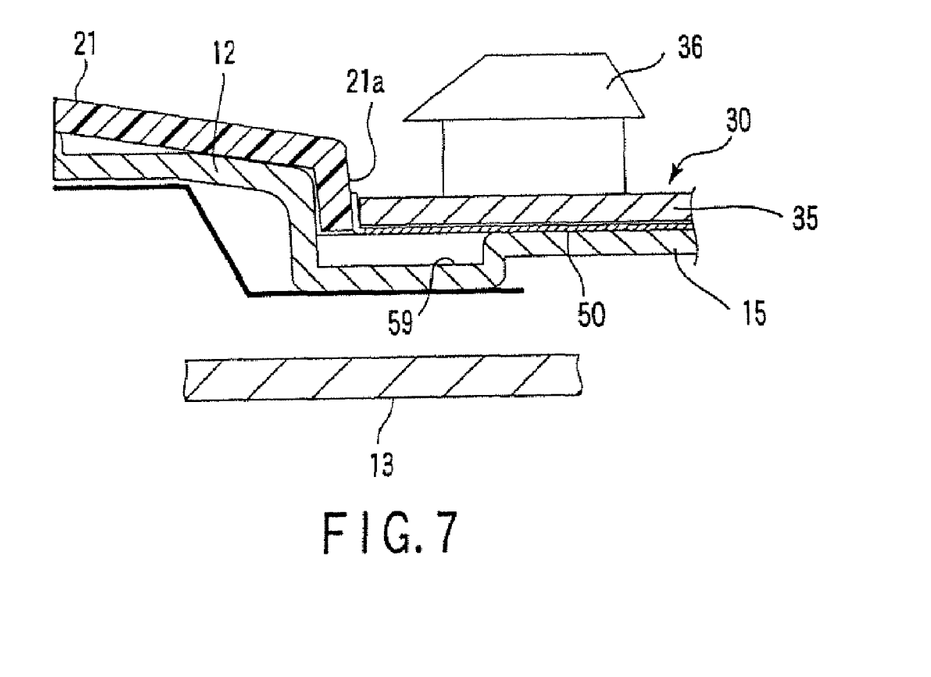
FIG. 7 is an exemplary sectional view cut off along a line F7-F7 in FIG. 1 according to the embodiment.
Figure 9:
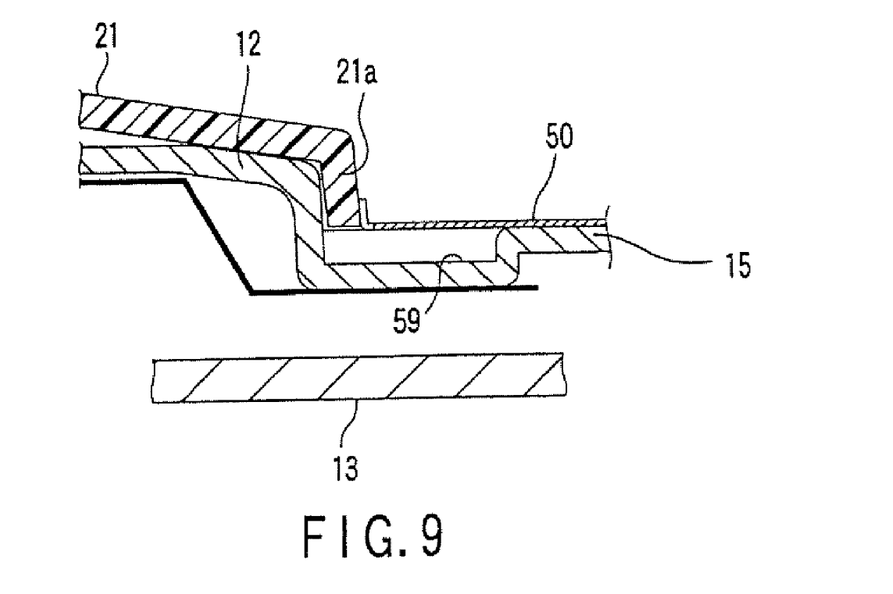
FIG. 9 is an exemplary sectional view cut off along a line F9-F9 in FIG. 2 according to the embodiment.

As shown in FIGS. 3, 7 and 9, a concave portion 59 is formed at a portion of the front end portion of the wall 15, and the lower portion 21a of an input device 21 is inserted in the concave portion 59. Some of liquid on the sheet 50 may be led to the concave portion 59 because the liquid flows in the direction from the rear of the wall 15 to the front thereof. That is to say, the concave portion 59 may be used as a liquid storage portion.

As shown in FIG. 1, the main body unit 2 includes a cover member 60 provided on the upper surface side of the rear thereof. The cover member 60 is formed of a first cover 61 and a second cover 62. The first cover 61 comprises a main portion 65 and a sound emitting portion 66. The main portion 65 is a long and narrow configuration formed along the width direction of the main body unit 2 and has a length that may cover the battery storage portion 23. The cover member 60 covers the keyboard support portion 41.

As shown in FIG. 2, a plurality of fitting portions 72 is formed in the upper housing 12. The first cover 61 has sliding type engagement portions (not shown) at positions corresponding to these engagement portions 72. These engagement portions are configured so as to be engaged with the fitting portions 72 when the first cover 61 slides in the horizontal direction.

Fit-in type engagement portions (not shown) are formed on the back surface of the second cover 62. The engagement portions for the second cover 62 are configured such that they may fit into the receiving portions 73 formed on the upper housing 12. The cover member 60 comprising the first and second covers 61 and 62 is removable from the housing 10.

The display unit 3 comprises a flat box-like case 100, a liquid crystal display panel (hereinafter "LCD") 101 provided in the case 100, a backlight (not shown) which is accommodated in the case 100, and the like. The display unit 3 is installed such that it may open and close in the vertical direction with respect to the main body unit 2 using the hinge portion 102 that is provided at the rear end side of the main body unit 2.

That is to say, the display unit 3 may rotate between the close position and the open position with respect to the main body unit 2. When the display unit 3 is closed, the image display screen of the LCD 101 is positioned downward and lies on top of the main body unit 2, while the upper surface of the main body unit 2 is covered from above by the display unit 3.

The operation of the portable computer 1 of this embodiment will be described in the following.

Assume that liquid such as water has accidentally spilled on the keyboard 30. Because the keyboard 30 is inclined such that the front portion is lower than the rear portion, the liquid that spills on the keyboard 30 moves to the upper surface of the sheet 50 which functions as a waterproofing sheet and flows toward the front. Subsequently, some of the liquid enters the liquid storage portion 58 from the engaging hole 31. Some of the liquid may also enter the concave portion 59. Furthermore, the absorption member 52 may also absorb some of the liquid. Because the openings 45 and 46 of the wall 15 are covered by the sheet 50, liquid is prevented from entering the circuit board 13.

If a liquid such as water spills on the keyboard 30, an operator turns off the power while the portable computer 1 is kept in the horizontal state. The cover member 60 is then removed from the housing 10. After the fixing members 42 are removed from the mounting portion 40 of the rear end of the keyboard 30, the keyboard 30 is removed from the wall 15 by removing the convex portions 32 at the front end of the keyboard 30 from the engaging hole 31.

FIGS. 8 and 9 show the state in which the keyboard 30 is removed. The liquid that has collected at the front portion or the concave portion 59 of the wall 15 is removed in this state. Also, the liquid that flows from the engaging hole 31 to the liquid storage portion 58 is also removed. Consequently, the main body unit 2 may be returned to a dry state.

According to this embodiment, by providing the sheet 50 which functions as a waterproof sheet and a waterproofing means which uses the engaging hole 31 for securing the keyboard 30, liquid which spills on the keyboard 30 is prevented from reaching the circuit board 13, without making the structure of the housing 10 or the keyboard 30 itself complex. Also, because the water storage portion 58 is formed by using the waterproof portion 57 made by extending a portion of the front end of the insulator 55 to cover the lower end opening portion of the lower wall 31a of the engaging hole 31, a part of the insulator 55 which covers the circuit board 13 is used efficiently.

It is to be noted that the electronic apparatus in accordance with the invention is not limited to a portable computer. That is to say, the invention may be applied in a similar manner to any electronic apparatus which has a keyboard and has a circuit board inside a case.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
    a housing including a keyboard mounting portion, the housing including at least one slot provided in the keyboard mounting portion, the at least one slot being sized for a portion of a keyboard to be inserted into the at least one slot; and
    a waterproof portion placed along a lower portion of the slot of the housing so as to prevent liquid that enters into the slot from leaking in a downward direction, both the waterproof portion and the housing, including a wall of the keyboard mounting portion, form a liquid storage portion for storing the liquid entering into the slot.

2. An electronic apparatus according to claim 1, wherein the wall of the keyboard mounting portion extends so that a front portion on an upper surface of the wall is lower than a rear portion on the upper surface of the wall.

3. An electronic apparatus according to claim 2, further comprising a sheet arranged between the wall and the keyboard.

4. An electronic apparatus according to claim 1, wherein the wall of the keyboard mounting portion is made of an electrically conductive material.

5. An electronic apparatus according to claim 4, further comprising:
    a circuit board arranged inside the housing; and
    an insulator, made of an electrically insulating material, arranged between a lower surface of the wall and the circuit board.

6. An electronic apparatus according to claim 5, wherein the waterproof portion is a part of the insulator.

7. An electronic apparatus according to claim 6, wherein an upper surface of the insulator is fixed to the lower surface of the wall by using both sided adhesive tape, and an upper surface of the waterproof portion is adhered to the edge of the at least one slot by using the adhesive tape.

8. An electronic apparatus according to claim 1, wherein the portion of the keyboard inserted into the slot is sized to provide an opening between the housing and the portion of the keyboard to allow liquid entering the slot to be stored within the liquid storage portion.

9. An electronic apparatus, comprising:
    a housing including a keyboard mounting portion and an upper housing extending into an area occupied by the keyboard mounting portion to create at least one slot formed by the upper housing and a bottom wall of the keyboard mounting portion;
    a circuit board positioned inside the housing and under the keyboard mounting portion; and
    a liquid impermeable sheet positioned under the bottom wall and extending partially under the upper housing, the sheet configured to insulate the circuit board from the keyboard mounting portion and to provide a liquid storage portion within the at least one slot thereby preventing liquid entering through the at least one slot from leaking in a downward direction.

10. An electronic apparatus according to claim 9, wherein the wall includes an upper surface that is inclined so that a front top surface of the wall is positioned vertically higher than a top back surface of the wall.

11. An electronic apparatus according to claim 9, wherein the sheet having an area wider than an area covered by the keyboard.

12. An electronic apparatus according to claim 9, wherein the sheet includes one or more erect walls positioned widthwise along edges of the sheet.

13. An electronic apparatus according to claim 9, further comprising an absorption member positioned along a lengthwise edge of the sheet.

14. An electronic apparatus according to claim 9, wherein the liquid storage portion is formed by the wall, the sheet, a downward protruding portion of the upper housing.

15. An electronic apparatus according to claim 14, wherein the liquid storage portion is further formed by a bottom surface of the keyboard.

16. An electronic apparatus, comprising:

a housing including a keyboard mounting portion, the keyboard mounting portion including a bottom wall that is forwardly inclined so as to be downward sloping and at least one slot;

a keyboard including keys and at least one convex portion protruding from a front end of the keyboard for insertion into the at least one slot of the keyboard mounting portion; and a waterproof sheet placed below the keyboard mounting portion and forming a lower surface of the slot so as to prevent liquid that enters into the slot via the keyboard from leaking in a downward direction, the waterproof sheet and the bottom wall of the keyboard mounting portion partially forming a liquid storage portion for storing the liquid entering into the slot.

\* \* \* \* \*